United States Patent Office 2,708,637
Patented May 17, 1955

2,708,637

METHOD OF MAKING A MOLDED LIGNOCELLULOSE PRODUCT

William T. Glab, Dubuque, Iowa, assignor to Carr, Adams & Collier Company, a corporation of Iowa No Drawing. Application June 16, 1951, Serial No. 232,065

8 Claims. (Cl. 106—163)

This invention relates to methods of making a molded lignocellulose product containing finely-divided lignocellulose and a finely-divided material comprising a relatively strong alkali with at least a portion of the alkali being chemically reacted with the lignocellulose or its decomposition products.

It is the general object of this invention to provide methods of making a molded lignocellulose product.

Another object is to provide methods of making such a lignocellulose product in which the lignocellulose material is initially in the form of particles having a moisture content not exceeding about 30% by weight and containing from about 0.25 to 30% by weight of a relatively strong alkali, and wherein this mixture is heated to an elevated temperature preferably between about 400 and 600° F. for a time sufficient to react chemically at least a portion of the alkali with the lignocellulose or its decomposition products.

A further object is to provide methods wherein the above material is compressed at a pressure preferably at least about 50 pounds per square inch while heating at an elevated temperature preferably between about 400 to 600° F. for a time sufficient to produce a compact self-sustaining product.

In general, the method of this invention involves mixing finely-divided lignocellulose and a small amount of a relatively strong alkali such as an alkaline earth oxide or hydroxide or an alkali hydroxide. The materials are mixed to form a substantially homogeneous mixture which is then heated to combine chemically at least a portion of the alkali with the lignocellulose. Where the lignocellulose and alkali mixture is given a preliminary heat treatment the product is a thermoplastic molding composition capable of being molded under pressure and heat to produce a product having the shape of the mold cavity. The thermoplasticity of this preheat material is proven by the fact that it can be cooled and then molded under heat and pressure.

The preheat product may be stored and then later molded under heat and pressure in a mold of suitable shape to produce articles as described above. It may also be used as a compounding ingredient to provide a filler or strengthener for various plastics including rubber.

It has long been known that lignocellulose particles such as finely-divided wood can be compressed into a coherent mass by heat and pressure as the heat apparently causes the lignin to become plastic and serve as a binder. The temperatures required, however, are so high that they cause rapid and almost spontaneous decomposition of the lignocellulose so that this method is not practical. By the methods of this invention, where a material comprising an alkali is employed with the lignocellulose, such decomposition is largely, although not completely, avoided so that temperatures may be used to produce a plastic mass that can easily be molded under pressure. Thus the alkali appears to retard thermal decomposition of the lignocellulose and it also appears to lessen the decomposing effect of water that may be present or that may be evolved in the initial decomposition. The lignocellulose used is relatively dry and preferably does not contain over 30% of water by weight of the dry lignocellulose, which is approximately the fiber saturation point.

The most important alkali metal hydroxides are those of sodium and potassium while the most important alkaline earth metal oxides and hydroxides are those of calcium, magnesium and barium. One very important material in this group has been found to be hydrated lime or calcium hydroxide. The hydrated lime may be either the ordinary calcium hydroxide produced by reacting water with calcium oxide or may be hydrated dolomitic lime which contains magnesium as well as calcium. Although the chemical reactions of this invention are not completely understood the alkali appears to neutralize acid decomposition products of the lignocellulose and thus prevents them from attacking and decomposing the remainder of the lignocellulose. The alkali also appears to break the lignocellulose bond to permit the lignin to become plastic during the heat treatment and serve as a binder. In any event, the alkali appears to retard thermal decomposition of the lignocellulose so that the mixture of lignocellulose and alkali becomes thermoplastic and moldable.

The lignocellulose that may be used in this invention includes wood and lignocellulosic vegetable materials as well as partially hydrolyzed or pulped lignocellulose. In order to insure intimate contact of the materials the lignocellulose material is finely divided with the particles preferably being not coarser than about 20 mesh in size although particles passing through a 50 mesh screen produce a smoother, stronger and finer-grained final product. As was explained above, the lignocellulose should be relatively dry, preferably containing not more than about 30% moisture by weight of the dry lignocellulose. In the preferred methods of making the products of this invention, the lignocellulose is bone dry. This means that there is substantially no loss in weight upon heating at 212° F.

The amount of alkali material used to make the products of this invention is preferably from about 0.25 to about 30% by weight of the dry lignocellulose, depending in part upon the type of alkali used. It has been found that if too small amount of alkali is used, the resulting composition is difficult to mold and less water resistant. If too much is used, the product is somewhat weakened. As the amount of alkali is increased the period during which the lignicellulose mixture can be heated without excessive decomposition also increases. However, heating for too great a period reduces the strength of the final molded product. Thus, where 12½% of hydrated lime, for example, by weight of dry lignocellulose is used, the heating period may be about 8 minutes. Where 24% of hydrated lime is used, this heating period may be 14 minutes.

The particle size of the solid alkali should be small in order to insure even distribution of the material throughout the lignocellulose and to bring the material into intimate contact with the particles of lignocellulose. In general, this particle size is preferably not coarser than about 100 mesh and is preferably finer than 200 or 300 mesh. These limitations mean that the material used is that which will pass through standard screens of these sizes.

The alkali that is used may be introduced into the finely-divided lignocellulose either in dry form or in a water solution. Where the alkali is an alkali metal hydroxide, a solution is preferably used. Thus, with sodium hydroxide a quantity of solution approximating 20–30% by weight of the lignocellulose may be added in a concentration such that the resulting mixture will contain from about 0.25 to 5% sodium hydroxide on a dry basis by weight of the lignocellulose. The mixture may then be dried to remove the water of the solution with the result that the sodium hydroxide is substantially uniformly distributed through the lignocellulose.

In preparing the products of this invention the lignocellulose and alkali are intimately mixed together to produce a substantially homogeneous mixture. This mixture is then preferably compacted so that during the subsequent heating step relatively good heat transfer may be achieved. The mixture is then preferably given an initial heating, or preheat, either under no pressure or light pressure in order to combine chemically a portion of the hydrated lime with the lignin and the cellulose and to drive off the initially copious gases which are believed to include water vapor and other gaseous degradation products. This initial heat treatment also makes the lignocellulose more thermoplastic for subsequent molding operations. The preheat temperature is relatively high to drive off these vapors and cause the chemical combination of some of the alkali but is maintained low enough so that excess charring is avoided and high boiling compounds are not lost.

The product of this preheat treatment is a molding composition that is capable of being molded under pressure and heat in a mold of a desired shape to produce molded products. This molding composition is a mixture of substantially dry lignocellulose with some chemically-reacted alkali substantially uniformly distributed therethrough. In the preferred preheat process the temperature is maintained between about 400 and 600° F. and this temperature is maintained for about 1 to 15 minutes, and preferably about 7 to 8 minutes. It has been found that if too low a temperature is maintained an insufficient amount of the alkali will be chemically reacted with the lignin and the cellulose and subsequent molding operations will be difficult. If too high a temperature is used the reactions and the evolution of the gases will be so violent that explosions are liable to occur. In general, a temperature of about 550° F. has been found to be highly satisfactory.

The type of alkali used has an effect on the preheat time. Thus, where the alkali is an alkaline earth oxide, such as quick lime, or an alkali metal hydroxide, such as sodium hydroxide, the preheat time will be relatively short. Thus with these stronger alkalies the preheat time may be only 1 to 3 minutes.

The thermoplastic molding composition prepared as described may be molded in a heated pressure mold of a desired shape to produce molded products. In this step the preheat composition is compressed for a relatively brief period at a desired pressure and heated generally within the same temperature range as was used in the preliminary heating. The pressure that is employed is governed by the desired characteristics in the final product. In general, this pressure will be between 50 and 5,000 pounds per square inch. At the lower pressures the product will be found to be more porous and somewhat fragile. However, low-pressure products may be used as insulation and for other uses where fragility is not a detriment and where the porosity of the product may be of advantage. At the higher pressures, the product is hard, dense and compact and more nearly resembles molded thermosetting resins, such as the highly reacted phenol-formaldehyde resins. Where the final product is to be a building board or wood panel substitute, the molding pressure is preferably between about 400 and 750 pounds per square inch.

In the final molding operation the pressure is maintained during the heating operation for a time sufficient to set the mixture. In general, this period will be between about ½ and about 30 minutes. If the heating time is too short the heat will not have time to penetrate the molding material; if the time is too long there is some danger of excessive pressure build-up within the mold and subsequent blowing of the product when pressure is released. In general, high temperatures require relatively brief molding times, and low temperatures require relatively longer molding times.

In one method of practicing this invention to make a compact self-sustaining hard board that can serve as a wood board substitute in that it can be sawed, nailed, shaped and similarly treated, finely-divided ponderosa pine wood having a maximum particle size of about 50 mesh and being substantially bone dry was mixed with 24% by weight of hydrated lime substantially all of which was ofa size to pass through a 100 mesh screen. The wood and hydrated lime were intimately mixed to produce a substantially homogeneous product. About 1¾ inches of this mixture was partially compacted into a square mold frame about 1″ deep. The mixture rested on a fine mesh wire screen which was supported on a metal plate. The plate, screen and frame had been preheated to about 550° F. A preheated metal top plate and block were then placed on the mold and the mold with the wood and hydrated lime mixture therein placed on the heated platen of a press. The mixture within the mold was compacted at a pressure of about 400 pounds per square inch in order to increase the efficiency of heat transfer through the mass and this pressure removed. The heated platen was maintained at a temperature such as to heat the mixture to about 550° F. This preheat was maintained for about 7 to 8 minutes during which relatively copious gases were given off. The screen aided in venting these gases.

At the end of the preheat period the partially reacted mass was compacted between the heated platens of the press for about 15 seconds at about 700 pounds per square inch pressure. This time interval permitted the mass to reach a substantially uniform density throughout. At the end of this time period the pressure was released to release entrapped gases from within the mold. As soon as these entrapped gases had been vented, pressure was again applied at 700 pounds per square inch and the mass simultaneously heated at about 550° F. for about 10 minutes. At the end of this time the screen backing was removed and pressure and heat was again applied for about ½ a minute to produce a fairly smooth bottom surface on the molded product. The mold and molded product were then removed from the press and the resulting board was removed from the mold. The molded product was a uniform dense board about $3/16''$ thick. The resulting board was found to have a high tensile strength, a specific gravity of about 1.3, a low water absorption when immersed in water for a 24-hour or longer period, very little swelling in water and to contain a very small amount of water soluble material. The board was capable of being sawed, nailed, machined, shaped and otherwise handled much in the same manner as ordinary wood boards, composition boards or plastic materials may be handled.

Under the same conditions as above but with a shorter time under pressure, boards smooth on both sides have been prepared without a screen backing.

Among the alkalis that have been found effective for producing the products of this invention are calcium, magnesium and barium oxides and hydroxides as well as sodium, potassium and ammonium hydroxides, and organic amines such as urea and the like.

If desired, the finely-divided lignocellulose can be heated in the absence of oxygen before adding the alkali. This heating, which is preferably at about 400 to 600° F. for about ½ to 1 hour, removes acid compounds and makes the lignocellulose more stable. As fewer acid groups are present after this heat treatment, a smaller amount of alkali may be used to achieve the same final results. Thus, when heating lignocellulose at from 400 to 600° F. for the time specified, the amount of alkali may be reduced to 50 to 75% of the amount required without this heat treatment.

The products of this invention may contain the usual plasticizers, such as polyhydric alcohols and high molecular weight fatty acids, and may contain fibrous or other reinforcing materials or other compounding ingredients to affect the properties of the final product.

The alkali used in this invention prevents excessive degradation of the cellulose present and causes a controlled decomposition to promote the cleavage of the lignin and cellulose bonds.

While the invention has been disclosed and described herein in a particular embodiment and in considerable detail, it is not intended that the invention be limited to the specific disclosures made. On the contrary, it is intended to cover all modifications and alternative constructions falling within the spirit and scope of the invention as defined in the appended claims.

I claim:

1. The method of making a lignocellulose product consisting essentially of intimately mixing particles of lignocellulose material having a maximum average particle size of about 50 mesh and a maximum moisture content of about 30% by weight with from about 0.25–30% of an essentially dry relatively strong alkali, and heating said mixture under pressure at about 400–600° F. for a time sufficient to combine chemically at least a major portion of said alkali with said lignocellulose.

2. The method of claim 1 wherein said alkali is a member of the class consisting of the oxides and hydroxides of the alkaline earth metals and the hydroxides of the alkali metals.

3. The method of claim 1 wherein said alkali consists of hydrated lime.

4. The method of making a lignocellulose product consisting essentially of intimately mixing particles of lignocellulose materials having a maximum average particle size of about 50 mesh and a maximum moisture content of about 30% by weight with from about 0.25–30% of an essentially dry alkali of the class consisting of the oxides and hydroxides of the alkaline earth metals and the hydroxides of the alkali metals, heating said mixture at from about 400–600° F. for a time sufficient to combine chemically a substantial portion of the alkali with the lignocellulose, venting the fumes from said chemical combining, and again heating at a temperature of from about 400–600° F. at a molding pressure, said combined heating being for a time sufficient to combine chemically at least a major portion of said alkali with said lignocellulose.

5. The method of claim 4 wherein said alkali consists of hydrated lime.

6. The method of claim 4 wherein said molding pressure is at least about 50 pounds per square inch.

7. A product prepared substantially by the method of claim 1.

8. A product prepared substantially by the method of claim 4.

References Cited in the file of this patent

UNITED STATES PATENTS

| Number | Name | Date |
|---|---|---|
| 612,098 | Christmas | Dec. 28, 1926 |
| 1,724,393 | Carpenter | Aug. 13, 1929 |
| 1,792,254 | Smyser | Feb. 10, 1931 |
| 2,067,012 | Loetscher | Jan. 5, 1937 |
| 2,381,269 | Elmendorf et al. | Aug. 7, 1945 |

FOREIGN PATENTS

| 403,180 | Italy | Apr. 7, 1943 |